United States Patent
Larsen

(10) Patent No.: US 8,378,629 B2
(45) Date of Patent: *Feb. 19, 2013

(54) FLEXIBLE SIZE AND ORIENTATION BATTERY SYSTEM

(75) Inventor: Glen C. Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/013,497

(22) Filed: Jan. 25, 2011

(65) Prior Publication Data

US 2011/0117389 A1    May 19, 2011

Related U.S. Application Data

(63) Continuation of application No. 12/729,906, filed on Mar. 23, 2010, now Pat. No. 7,884,573.

(60) Provisional application No. 61/262,898, filed on Nov. 19, 2009.

(51) Int. Cl.
*H02J 7/00* (2006.01)

(52) U.S. Cl. ............................. 320/110; 429/1

(58) Field of Classification Search ........................ None
See application file for complete search history.

(56) References Cited

U.S. PATENT DOCUMENTS

| | | | |
|---|---|---|---|
| 5,376,476 A | 12/1994 | Eylon | |
| 5,431,575 A | 7/1995 | Engira | |
| 5,606,238 A * | 2/1997 | Spellman et al. | 320/110 |
| 6,610,941 B2 * | 8/2003 | Pfeiffer | 200/61.58 R |
| 7,884,573 B1 * | 2/2011 | Larsen | 320/110 |
| 2008/0268296 A1 * | 10/2008 | Larsen | 429/1 |

OTHER PUBLICATIONS

"International Search Report", Mailed Date: Jul. 5, 2011, Application No. PCT/US2010/056765, Filed Date: Nov. 16, 2010, pp. 8.

* cited by examiner

*Primary Examiner* — Ramy Ramadan
(74) *Attorney, Agent, or Firm* — Alleman Hall McCoy Russell & Tuttle LLP

(57) ABSTRACT

A battery receptacle system is provided to accept various types or sizes of batteries in different orientations. The battery receptacle system includes a first radial notch for positioning a first positive terminal of a first battery to electrically connect with the first positive contact at a first position, and a second radial notch for positioning a second positive terminal of a second battery of a different size and/or type than the first battery to electrically connect with the first positive contact at a second position, different from the first position. The second radial notch is configured to prevent the first positive terminal of the first battery from electrically connecting with the first positive contact at the second position.

20 Claims, 6 Drawing Sheets

FLEXIBLE SIZE AND ORIENTATION BATTERY SYSTEM

CROSS-REFERENCE TO RELATED APPLICATIONS

This application is a continuation of U.S. patent application Ser. No. 12/729,906, filed Mar. 23, 2010 and entitled "FLEXIBLE SIZE AND ORIENTATION BATTERY SYSTEM", which claims priority to U.S. Provisional Patent Application Ser. No. 61/262,898, filed on Nov. 19, 2009 and entitled REVERSE BATTERY POLARITY PROTECTION ASSEMBLY FOR DIFFERENT TYPES OF BATTERIES, the entirety of each of which is hereby incorporated herein by reference for all purposes.

BACKGROUND

In previous electrical battery device solutions, users insert batteries in a particular orientation, taking care to properly align positive and negative terminals with corresponding polarity-specific contacts on the device. Incorrectly orienting batteries in such previous solutions not only renders the electrical circuit inert, but also may damage the battery or other electronic components.

Furthermore, in previous solutions, a device may be configured to receive a particular type or size of battery and maintain an electrical connection with only that type or size of battery. A battery of a different type or size could not be used with that device.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

According to one aspect of the disclosure, a battery receptacle system is provided to accept various types and/or sizes of batteries in different orientations to achieve an electrical connection. According to another aspect, the battery receptacle system may include actuatable retention arms that are adjustable to accommodate different diameter batteries, extending to retain smaller diameter batteries and retracting so as to not impede larger diameter batteries. According to another aspect, the battery receptacle system may include a translating assembly that is adjustable to accommodate different length batteries, extending to retain shorter batteries and retracting to accommodate larger batteries.

DETAILED DESCRIPTION

The present disclosure relates to a battery receptacle system that accepts different types of batteries to be electrically connected with positive and negative contacts in various orientations with protection against reverse polarity. In many cases, a battery will have two terminals (positive and negative) that are to be electrically connected to a pair of contact assemblies. The pair of contact assemblies presents the possibility of physically orienting a battery in the battery receptacle system in one of two different orientations. The battery receptacle system examples described herein allow different types of batteries to be validly connected in either orientation. In other words, in either orientation, appropriate electrical connectivity is established to permit operation and avoid the electrical/mechanical damage that can arise in previous solutions that allow for only one valid orientation of one type of battery.

For example, either an AA-battery or an AAA-battery can be inserted into the battery receptacle system in either orientation, so that the correct polarity is delivered to the dual-contact assemblies to achieve an electrical connection. This allows a user much more freedom and flexibility in battery choice and availability as well as a convenient orientation forgiving installation. While the examples herein will often focus on the use of an AA-battery and an AAA-battery, it will be appreciated that the present discussion is applicable to other battery and terminal configurations.

For example, a battery receptacle system may be configured to receive and achieve a valid electrical connection with any one of a variety of different types of batteries including AAA-batteries, AA-batteries, C-batteries, D-batteries, or any other suitable cylinder-type or button-type batteries. In some embodiments, a battery receptacle system may be configured to accept two different types of batteries (e.g., AA-type and AAA-type) in different orientations. In some embodiments, a battery receptacle system may be configured to accept more than two different types of batteries (e.g., D-type, C-type, AA-type, and AAA-type) in different orientations.

Figure 1A:
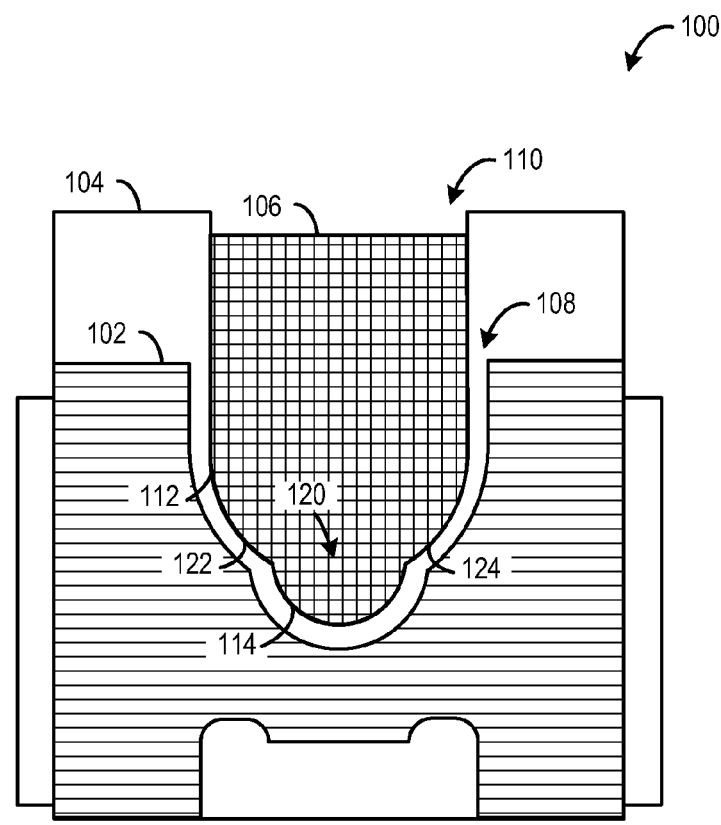
FIGS. 1A-1B schematically show a dual-contact assembly configured to interact with different sizes/types of batteries in different orientations.

FIG. 1A shows a working side of a dual-contact assembly 100 that is configured to accept a positive terminal or a negative terminal of two different sizes or types of batteries. The dual-contact assembly 100 may be used in conjunction with an opposing dual-contact assembly in a battery receptacle system to achieve an electrical connection when a battery is physically and electrically between the opposing dual-contact assemblies in either a first orientation or a second orientation, as shown by way of example in FIGS. 2-5.

The dual-contact assembly includes a negative contact 102, an insulating connector 104, and a positive contact 106. The negative contact 102 is positioned on a front or inner face of the dual-contact assembly 100 so as to physically contact a substantially flat surface of a negative terminal of a battery to achieve an electrical connection when the battery is in one of two orientations. The negative contact 102 forms a centrally located pass-through area 108 that permits a positive terminal of a battery to protrude past the negative contact 102 and touch the positive contact 106 when the battery is in the other of the two orientations to achieve an electrical connection. The pass-through area 108 is larger than the diameter of the positive terminal so that the positive terminal does not touch the negative contact when it is positioned to touch the positive contact. The pass-through area 108 is centrally located to accommodate the positive terminal. Correspondingly, the negative terminal electrically connects with the negative contact 102 substantially at the periphery of the negative contact.

The insulating connector 104 is positioned between the positive contact 106 and the negative contact 102 to prevent the two contacts from touching each other and causing a short circuit. The insulating connector 104 forms a pass-through area 110 that is aligned with pass-through area 108 so as to permit a positive terminal of a battery to touch the positive contact 106. The pass-through area 110 formed by the insulating connector 104 may be slightly smaller than the pass-through area 108 formed by negative contact 102. This allows the insulating connector 104 to support the positive terminal when the positive terminal is electrically connected with the positive contact 106 without the positive terminal touching the negative contact. In particular, the insulating connector 104 prevents the curved circumferential edge of the positive terminal from touching the thin edge of the negative contact that forms the pass-through area.

In some embodiments, the insulating connector physically may connect the negative contact with the positive contact while preventing an electrical connection between the negative contact and the positive contact. In some embodiments, the insulating connector may be made of an electrically insulating material that substantially limits electrical conduction. In some embodiments, the insulating connector may be omitted and the positive contact and the negative contact may be spaced far enough apart to avoid electrically connecting with each other.

The positive contact 106 is recessed from the negative contact 102 to allow for a positive terminal of a battery to protrude past the negative contact and electrically connect with the positive contact. Correspondingly, since the positive contact 106 is recessed from the negative contact 102, a flat negative terminal of a battery does not touch the positive contact when it is positioned to electrically connect with the negative contact. Further, the positive contact 106 is centrally exposed via pass-through area 108 and pass-through area 110 so as to be aligned with the positive terminal of a battery.

Note the example batteries that include a protruding positive terminal and a flat negative terminal are not limiting. Indeed, a battery could have a positive flat terminal and a negative protruding terminal. The polarity of the below described circuits could be reversed to accommodate such batteries.

Figure 1B:
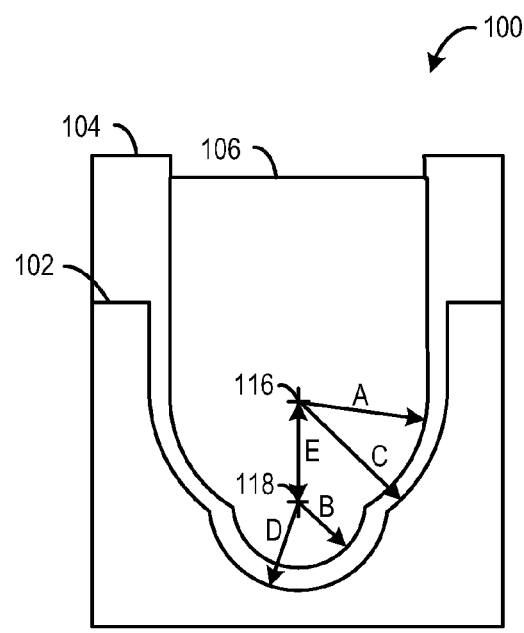

Continuing with FIG. 1, the dual-contact assembly 100 includes different portions that are each configured to position a positive terminal of a different type and/or size of battery to electrically connect with positive contact 106. The dual-contact assembly 100 includes a first portion that forms a larger radial notch 112 for positioning a positive terminal of a larger battery to electrically connect with the positive contact 106. As shown in FIG. 1B, the positive terminal of the larger battery connects with positive contact 106 at an upper position 116 on the positive contact. The larger radial notch 112 has a radius A centered at upper position 116. The larger radial notch 112 has a diameter that accommodates the diameter of the positive terminal of the larger battery to provide slight axial compression on the larger battery to help retain the battery at position 116 to maintain the electrical connection. The larger radial notch 112 is formed by a left-side arced segment 122 and a right-side arced segment 124. The left-side arced segment 122 and the right-side arced segment 124 are interrupted by a second portion that forms a smaller radial notch 114 such that a gap 120 is formed between the left-side arced segment and the right-side arced segment.

The smaller radial notch 114 is for positioning a positive terminal of a smaller battery to electrically connect with the positive contact 106. As shown in FIG. 1B, the positive terminal of the smaller battery connects with positive contact 106 at a lower position 118 on the positive contact. The smaller radial notch 114 has a radius B centered at lower position 118, which is smaller than the radius A of the larger radial notch 112. The smaller radial notch 114 has a diameter that accommodates the diameter of the positive terminal of the smaller battery to provide slight axial compression on the smaller battery to help retain the battery in place in order to maintain the electrical connection.

In the illustrated example, the smaller radial notch 114 and the larger radial notch 112 are vertically aligned so that the upper position 116 at which the larger battery electrically connects with the positive contact and the lower position 118 at which the smaller battery electrically connects with the positive contact are vertically aligned. Other configurations may be used without departing from the intended scope of this disclosure. The gap 120 prevents the smaller diameter positive terminal of the smaller battery from electrically connecting with the positive contact 106 at position 116 where the larger battery would connect with the positive contact.

In contrast, in previous solutions that do not include differently sized radial notches configured to accommodate different sizes of batteries, the positive terminal of a smaller battery may not be secured, but rather may shift within the larger radial notch, and thus may not hold the battery as well to maintain the electrical connection with the positive contact.

On the other hand, the gap 120 of dual-contact assembly 100 allows for the positive terminal of the smaller battery to fall into the smaller radial notch to be secured in electrical connection with the positive contact. Moreover, the smaller radial notch 114 prevents the positive terminal of a larger battery from electrically connecting with the positive contact 106 at the lower position 118 because the diameter of the smaller radial notch is smaller than the diameter of the positive terminal of the larger battery.

In the illustrated embodiment, the insulating connector 104 forms the larger radial notch 112 and the smaller radial notch 114. It will be appreciated that the larger radial notch and the smaller radial notch may be formed by any suitable element of the dual-contact assembly. In some embodiments, the radial notches may be positioned differently on the dual-contact assembly to accommodate different battery positions. In some embodiments, structure other than radial notches may be used to support positive terminals of different types of batteries. In some embodiments, the dual-contact assemblies may include more than two radial notches having different sizes to accommodate positive terminals of more than two different types of batteries.

It will be appreciated that each of the radial notches of the dual-contact assembly may be sized to accommodate a different type of battery. Further, the different radial notches may be sized differently to accommodate different combinations of different types of batteries. For example, the dual-contact assembly may include radial notches configured to receive either of an AAA-battery or an AA-battery. As another example, the dual-contact assembly may include radial notches configured to receive either of an AA-battery or a C-battery. As yet another example, the dual-contact assembly may include radial notches configured to receive either of a C-battery or a D-battery.

The following chart shows approximate dimensions (in millimeters) of the above described radial notches of the dual-contact assembly for different types of batteries. The A dimension corresponds to the radius of the larger radial notch. The B dimension corresponds to the radius of the smaller radial notch. The C dimension corresponds to a radius of a first portion of pass-through area 108 formed by negative contact 102 to accommodate the larger battery. The D dimension corresponds to a radius of a second portion of pass-through area 108 formed by negative contact 102 to accommodate the smaller battery. The C dimension is sized to be slightly larger than the A dimension so that when the positive terminal of the larger battery is electrically connected with the positive contact, the positive terminal is not touching the negative contact. Likewise, the D dimension is sized to be slightly larger than the B dimension so that when the positive terminal of the smaller battery is electrically connected with the positive contact, the positive terminal is not touching the negative contact. The E dimension is the distance between the battery axial centerlines of the larger and smaller batteries—in other words, the upper position at which the larger battery is positioned to be electrically connected with the positive contact and the lower position at which the smaller battery is positioned to be electrically connected with the positive contact.

| Battery Combinations | Dimension A | Dimension B | Dimension C | Dimension D | Dimension E |
|---|---|---|---|---|---|
| AAA/AA | 2.75 mm | 1.9 mm | 3.5 mm | 3.5 mm | 2 mm |
| AA/C | 3.75 mm | 2.75 mm | 6.5 mm | 6.5 mm | 5.85 mm |
| C/D | 4.75 mm | 3.75 mm | 9 mm | 9 mm | 4 mm |

Figure 2:
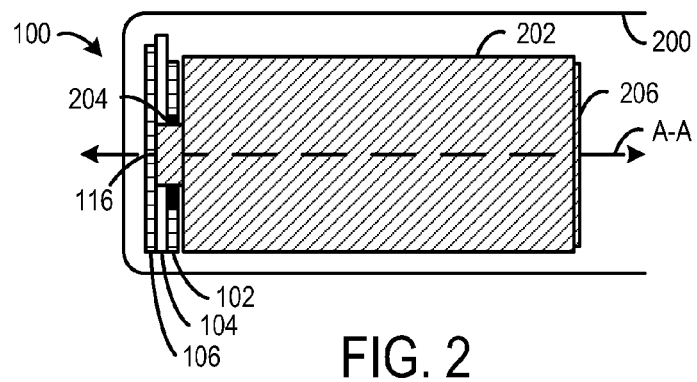
FIG. 2 schematically shows the dual-contact assembly of FIGS. 1A-1B electrically connected with a larger battery in a first orientation.

FIGS. 2-5 schematically show examples of how different types/sizes of batteries can electrically connect with a dual-contact assembly 100 in different orientations in a battery receptacle system 200. FIG. 2 shows a larger battery 202 in a first orientation in which a positive terminal 204 electrically connects with positive contact 106. When the larger battery 202 is in the first orientation, the positive contact 106 is configured to electrically connect with the positive terminal 204 of the larger battery 202 without the positive terminal of the larger battery electrically connecting with the negative contact 102. For clarity of illustration, the gap between the positive terminal of the larger battery and the negative contact is shown in solid black. When the larger battery 202 is in the first orientation, the positive terminal 204 of the larger battery electrically connects with the positive contact 106 at position 116, which corresponds with a longitudinal axis A-A of the larger battery.

Figure 3:
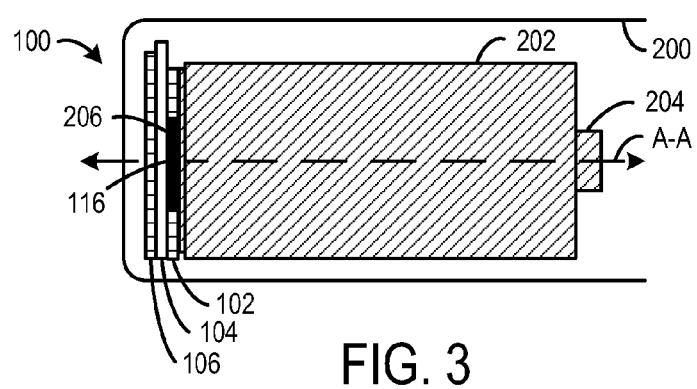
FIG. 3 schematically shows the dual-contact assembly of FIGS. 1A-1B electrically connected with the larger battery in a second orientation.

FIG. 3 shows the larger battery 202 in a second orientation in which a negative terminal 206 of the larger battery electrically connects with negative contact 102 of dual-contact assembly 100. When the larger battery 202 is in the second orientation, the negative contact 102 is configured to electrically connect with the negative terminal 206 of the larger battery 202 without the negative terminal of the larger battery electrically connecting with the positive contact 106. When the larger battery 202 is in the second orientation, the longitudinal axis A-A of the larger battery is substantially aligned with position 116. In other words, the larger battery 202 maintains the same axial alignment in both the first orientation and the second orientation.

Figure 4:
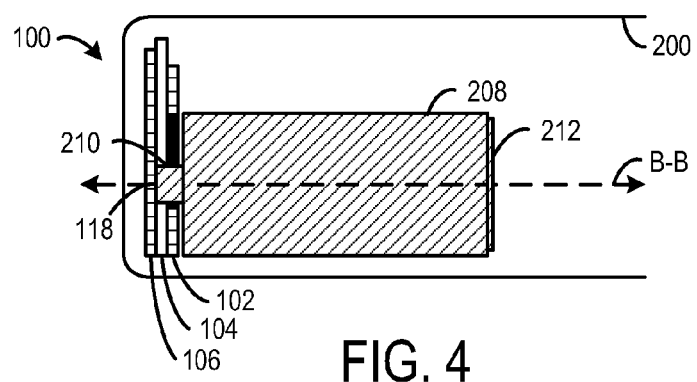
FIG. 4 schematically shows the dual-contact assembly of FIGS. 1A-1B electrically connected with a smaller battery in a first orientation.

FIG. 4 shows a smaller battery 208 in a first orientation in which a positive terminal 210 of the smaller battery electrically connects with positive contact 106 of dual-contact assembly 100. The smaller battery 208 has a smaller diameter, a shorter length, and a positive terminal that has a smaller diameter than the diameter of the positive terminal of the larger battery. When the smaller battery 208 is in the first orientation, the positive contact 106 is configured to electrically connect with the positive terminal 210 of the smaller battery 208 without the positive terminal of the smaller battery electrically connecting with the negative contact 102. For clarity of illustration, the gap between the positive terminal of the smaller battery and the negative contact is shown in solid black. When the smaller battery 208 is in the first orientation, the positive terminal 210 of the smaller battery electrically connects with the positive contact 106 at position 118, which corresponds with a longitudinal axis B-B of the smaller battery.

Figure 5:
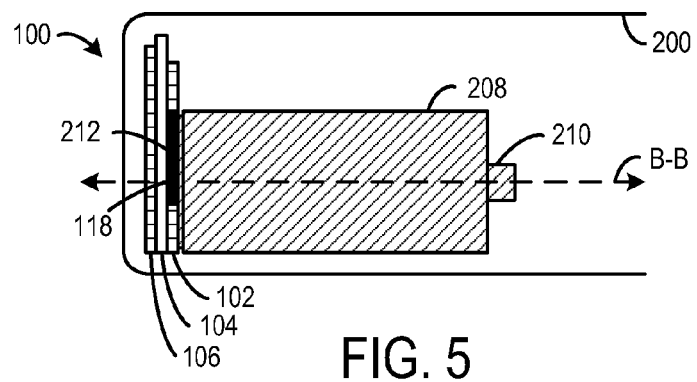
FIG. 5 schematically shows the dual-contact assembly of FIGS. 1A-1B electrically connected with the smaller battery in a second orientation.

FIG. 5 shows the smaller battery 208 in a second orientation in which a negative terminal 212 of the smaller battery electrically connects with negative contact 102 of dual-contact assembly 100. When the smaller battery 208 is in the second orientation, the negative contact 102 is configured to electrically connect with the negative terminal 212 of the smaller battery 208 without the negative terminal of the smaller battery electrically connecting with the positive contact 106. When the smaller battery 208 is in the second orientation, the longitudinal axis B-B of the smaller battery is substantially aligned with position 118. In other words, the smaller battery 208 maintains the same axial alignment in both the first orientation and the second orientation.

Figure 6:
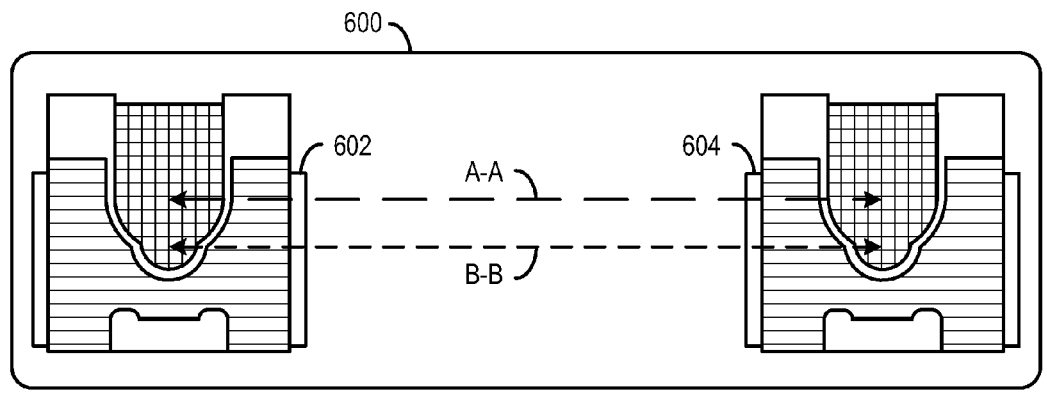
FIG. 6 schematically shows an embodiment of a battery receptacle system.

FIG. 6 schematically shows an embodiment of a battery receptacle system 600 that includes a first dual-contact assembly 602 and a second dual-contact assembly 604. For simplicity of illustration, first dual-contact assembly 602 and second dual-contact assembly 604 are shown with working sides facing in the same direction. However, it is to be understood that opposing dual-contact assemblies are to be orientated with working sides facing each other in practice. Furthermore, as described with reference to FIGS. 11 and 12 below, a translating assembly may be used to change a distance between opposing dual-contact assemblies to accommodate batteries having different lengths. Each of the dual-contact assemblies includes a positive contact and a negative contact. Further, each of the dual-contact assemblies includes different radial notches configured to position a positive terminal of a specific type and/or size of battery (e.g., AA-type, AAA-type, etc.) to electrically connect with the positive contact of that dual-contact assembly without the positive terminal electrically connecting with the negative contact of that dual-contact assembly. Such features allow for different types of batteries to achieve an electrical connection with the dual-contact assemblies in different orientations in the battery receptacle system. Moreover, such features may provide for more flexible battery power/charging options in electronic devices, and may reduce the likelihood of battery or component damage due to reverse polarization.

For example, when a larger battery is inserted in a first orientation in the battery receptacle system 600, a positive terminal of the larger battery electrically connects with the positive contact of the first dual-contact assembly 602 without the positive terminal of the larger battery electrically connecting with the negative contact of the first dual-contact assembly. Correspondingly, a negative terminal of the larger battery electrically connects with the negative contact of the second dual-contact assembly 604 without the negative terminal of the larger battery electrically connecting with the positive contact of the second dual-contact assembly. When the larger battery is in the first orientation, the larger battery has a longitudinal axis A-A.

When the larger battery is inserted in a second orientation in the battery receptacle system 600, the positive terminal of the larger battery electrically connects with the positive contact of the second dual-contact assembly 604 without the positive terminal of the larger battery electrically connecting with the negative contact of the second dual-contact assembly. Correspondingly, the negative terminal of the larger battery electrically connects with the negative contact of the first dual-contact assembly 602 without the negative terminal of the larger battery electrically connecting with the positive contact of the first dual-contact assembly. When the larger battery is in the second orientation, the larger battery has the same longitudinal axis A-A. In other words, the larger battery maintains the same axial alignment in both the first orientation and the second orientation.

As another example, when a smaller battery is inserted in a first orientation in the battery receptacle system 600, a positive terminal of the smaller battery electrically connects with the positive contact of the first dual-contact assembly 602 without the positive terminal of the smaller battery electrically connecting with the negative contact of the first dual-contact assembly. Correspondingly, a negative terminal of the smaller battery electrically connects with the negative contact of the second dual-contact assembly 604 without the negative terminal of the smaller battery electrically connecting with the positive contact of the second dual-contact assembly. When the smaller battery is in the first orientation, the smaller battery has a longitudinal axis B-B.

When the smaller battery is inserted in a second orientation in the battery receptacle system 600, the positive terminal of the smaller battery electrically connects with the positive contact of the second dual-contact assembly 604 without the positive terminal of the smaller battery electrically connecting with the negative contact of the second dual-contact assembly. Correspondingly, the negative terminal of the smaller battery electrically connects with the negative contact of the first dual-contact assembly 602 without the negative terminal of the smaller battery electrically connecting with the positive contact of the first dual-contact assembly. When the smaller battery is inserted in the second orientation, the smaller battery has the same longitudinal axis B-B. In other words, the smaller battery maintains the same axial alignment in both the first orientation and the second orientation.

The dual-contact assemblies may be configured to position the larger and smaller batteries such that their longitudinal axes are vertically aligned and/or substantially parallel to each other when the larger or smaller batteries are in either orientation.

Figure 7:
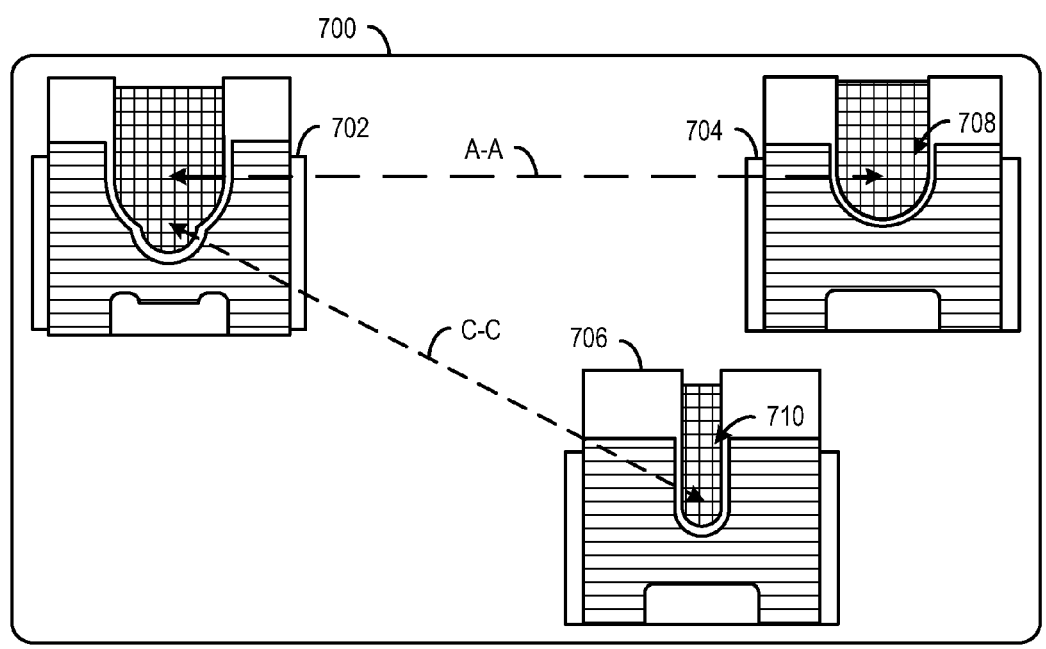
FIG. 7 schematically shows another embodiment of a battery receptacle system.

FIG. 7 schematically shows another embodiment of a battery receptacle system 700 that includes a first dual-contact assembly 702, a second dual-contact assembly 704, and a third dual-contact assembly 706. For simplicity of illustration, first dual-contact assembly 702, second dual-contact assembly 704, and third dual-contact assembly 706 are shown with working sides facing in the same direction. However, it is to be understood that opposing dual-contact assemblies are to be orientated with working sides facing each other in practice. In other words, the working side of dual-contact assembly 702 faces the working sides of both dual-contact assembly 704 and dual-contact assembly 706 in practice.

The first dual-contact assembly 702 is configured to receive different sizes of batteries in different orientations. The second dual-contact assembly 704 is configured to receive a larger battery in different orientations. In particular, the second dual-contact assembly 704 includes a radial notch 708 for positioning a positive terminal of the larger battery to electrically connect with a positive contact of the second dual-contact assembly. The third dual-contact assembly 706 is configured to receive a smaller battery in different orientations. More particularly, the third dual-contact assembly 706 includes a radial notch 710 for positioning a positive terminal of the smaller battery to electrically connect with a positive contact of the third dual-contact assembly.

The third dual-contact assembly 706 may be positioned below the second dual-contact assembly 704 within the battery receptacle system 700 so as not to impede a larger battery from electrically connecting with the first dual-contact assembly 702 and the second dual-contact assembly 704. For example, the third dual-contact assembly may be recessed, at an angle, into a floor of the battery receptacle system 700. Likewise, since the second dual-contact assembly 704 is positioned above the third dual-contact assembly 706 within the battery receptacle system 700, the second dual-contact assembly does not impede a smaller battery from electrically connecting with the first dual-contact assembly 702 and the third dual-contact assembly 706. Such features allow for different types of batteries to achieve an electrical connection in different orientations with the first dual-contact assembly 702 and either the second dual-contact assembly 704 or the third dual-contact assembly 706, depending on the type and/or length of battery.

For example, when the larger battery is inserted in a first orientation in the battery receptacle system 700, a positive terminal of the larger battery electrically connects with a positive contact of the first dual-contact assembly 702 without the positive terminal of the larger battery electrically connecting with a negative contact of the first dual-contact assembly. Correspondingly, a negative terminal of the larger battery electrically connects with a negative contact of the second dual-contact assembly 704 without the negative terminal of the larger battery electrically connecting with a positive contact of the second dual-contact assembly.

When the larger battery is inserted in a second orientation in the battery receptacle system 700, the positive terminal of the larger battery electrically connects with the positive contact of the second dual-contact assembly 704 without the positive terminal of the larger battery electrically connecting with the negative contact of the second dual-contact assembly. Correspondingly, the negative terminal of the larger battery electrically connects with the negative contact of the first dual-contact assembly 702 without the negative terminal of the larger battery electrically connecting with the positive contact of the first dual-contact assembly.

As another example, when a smaller battery is inserted in a first orientation in the battery receptacle system 700, a positive terminal of the smaller battery electrically connects with the positive contact of the first dual-contact assembly 702 without the positive terminal of the smaller battery electrically connecting with the negative contact of the first dual-contact assembly. Correspondingly, a negative terminal of the smaller battery electrically connects with a negative contact of the third dual-contact assembly 706 without the negative terminal of the smaller battery electrically connecting with a positive contact of the third dual-contact assembly.

When the smaller battery is inserted in a second orientation in the battery receptacle system 700, the positive terminal of the smaller battery electrically connects with the positive contact of the third dual-contact assembly 706 without the positive terminal of the smaller battery electrically connecting with the negative contact of the third dual-contact assembly. Correspondingly, the negative terminal of the smaller battery electrically connects with the negative contact of the first dual-contact assembly 702 without the negative terminal of the smaller battery electrically connecting with the positive contact of the first dual-contact assembly.

The larger battery maintains the same axial alignment A-A in both the first orientation and the second orientation. Likewise, the smaller battery maintains the same axial alignment C-C in both the first orientation and the second orientation. The dual-contact assemblies may be configured to position the larger and smaller batteries such that their longitudinal axes are vertically aligned when the larger or smaller batteries are in either orientation. The dual-contact assemblies may be configured to position the larger and smaller batteries such that their longitudinal axes are skewed (i.e., non-parallel) when the larger or smaller batteries are in either orientation.

While battery receptacle system 700 includes second and third dual-contact assemblies that are configured to accommodate a single size battery, it is to be understood that the second and third dual contact assemblies may be configured like the first dual-contact assembly. Using the same parts may decrease manufacturing costs. As another example embodiment, instead of using the same parts, the first dual-contact assembly 602 and/or the second-dual contact assembly 604 may contain a spring or compliant feature to allow for size variations within the same battery size/type (i.e., a small AA or a large AA, in terms of manufacturing variation of the battery itself). In this way electrical conductivity may be facilitated, despite manufacturing variation. Likewise, the first dual-contact assembly 702, the second dual-contact assembly 704, and/or the third dual-contact assembly 706 may contain a spring or compliant feature to allow for size variations within the same battery size/type (i.e., a small AA or a large AA, in terms of manufacturing variation of the battery itself). In this way electrical conductivity may be facilitated, despite manufacturing variation.

Figure 8A:
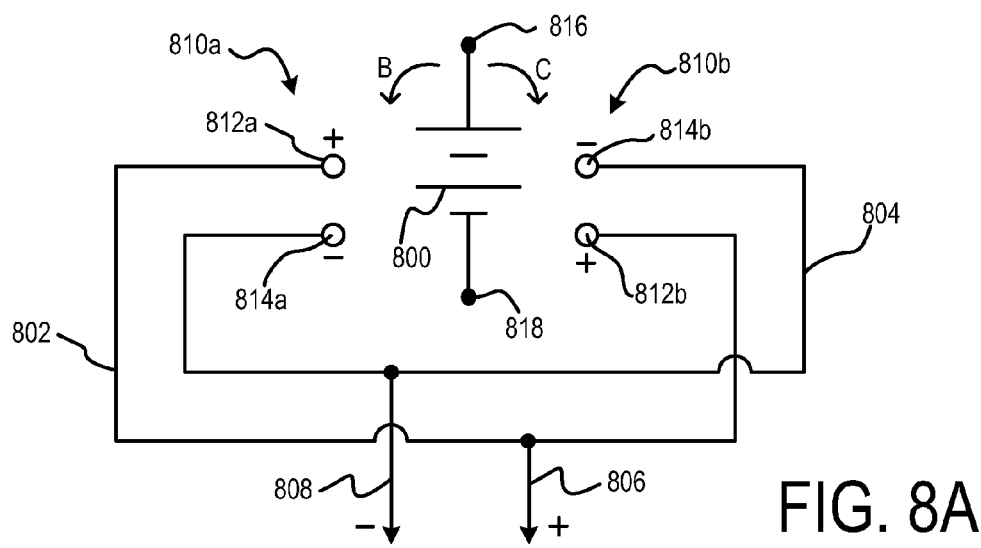
FIGS. 8A-8C show electrical schematics of an embodiment of a battery receptacle system.
Figure 8B:
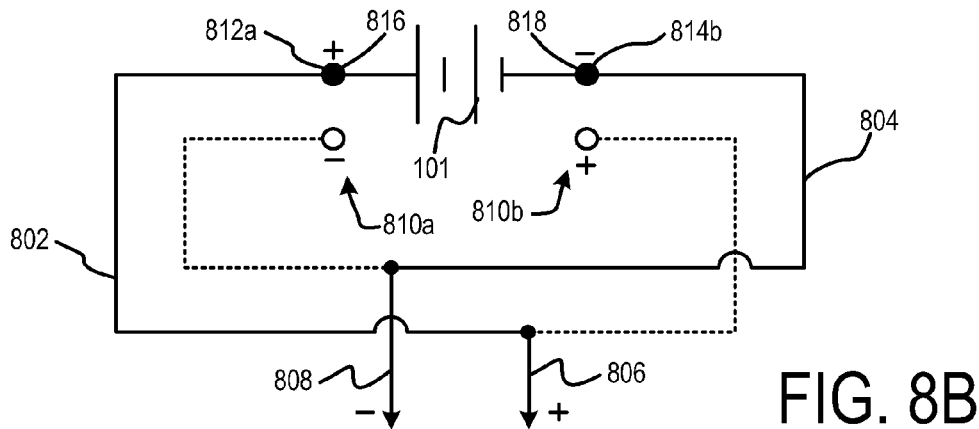
Figure 8C:
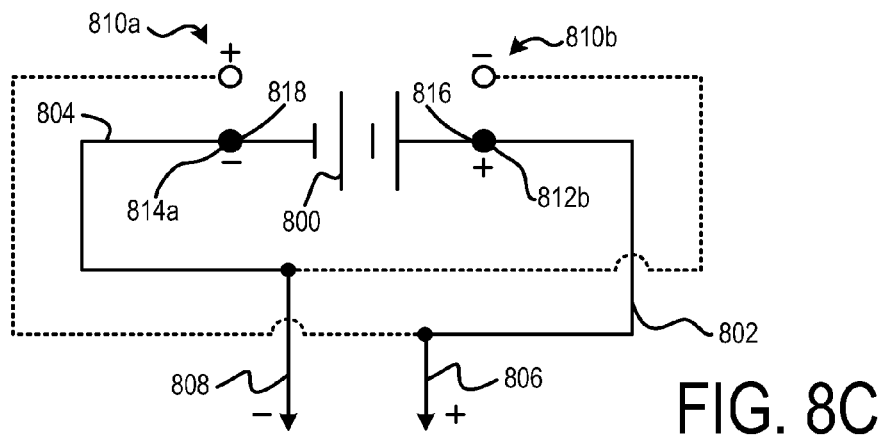

FIGS. 8A-8C show schematics of how the electrical connections can be achieved in the battery receptacle system described above. In FIG. 8A, the electrical traces 802 and 804 are schematically shown as these are connected to the respective wire connections 806, 808 going to the electrical circuitry (not shown) of the device (also not shown) to be powered by a battery 800. The battery 800 is shown schematically, and not connected to the circuitry in FIG. 8A. Also shown are the respective dual-contact assemblies 810a and 810b with their respective positive contacts 812a and 812b, and negative contacts 814a and 814b. The battery 800 is shown in a relatively neutral position in FIG. 8A, the respective positive and negative terminals 816 and 818 not touching any of the contacts of the dual-contact assemblies. Further indications are provided for the rotation of the battery either in direction B toward the connection shown in FIG. 8B, or in direction C toward the connection shown in FIG. 8C.

In FIG. 8B, the battery 800 is shown as it would be connected with the positive terminal 816 contacting the positive contact 812a of the dual-contact assembly 810a, while the negative terminal 818 of the battery 800 is contacting the negative contact 814b of the dual-contact assembly 810b. A closed electrical path is shown in FIG. 8B by the solid line portions of the respective traces 802 and 804, which thereby provide for electrical current flow to the respective positive and negative wire connections 806 and 808. The unused contacts are still electrically connected to the ones that are used, but do not participate in a closed circuit.

The substantially opposite orientation of the battery and current flow is shown in FIG. 8C, where the battery 800 is shown as it would be rotated in the C direction of FIG. 8A and thereby connected with the positive terminal 816 contacting the positive contact 812b of the dual-contact assembly 810b, while the negative terminal 818 of the battery 800 is in contact with the negative contact 814a of the dual-contact assembly 810a. A closed electrical path is shown in FIG. 8C, contrary to that of FIG. 8B, by the solid line portions of the respective traces 802 and 804, which thereby provide for electrical current flow to the respective positive and negative wire connections 806 and 808. Here again, the unused contacts are still electrically connected to the ones that are used, but do not participate in a closed circuit.

Figure 9:
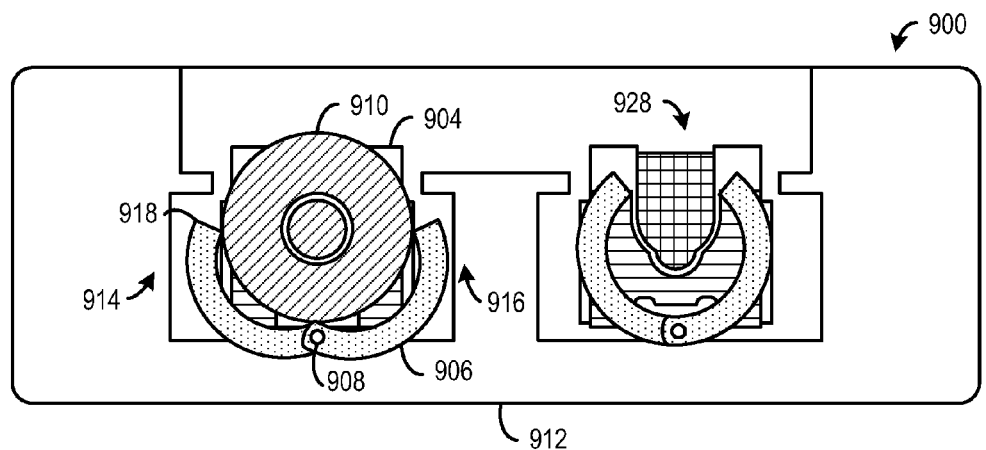
FIG. 9 shows a cross-section of an embodiment of a battery receptacle system with a larger battery that displaces actuatable retention arms.
Figure 10:
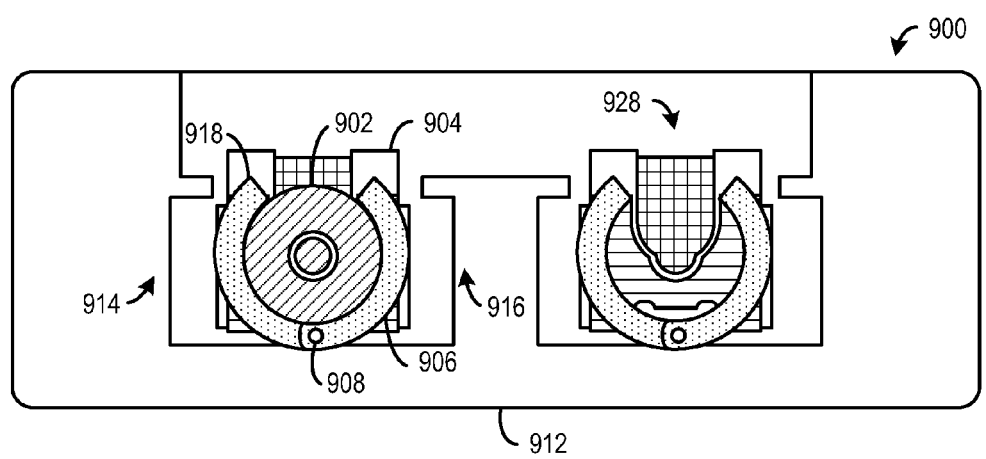
FIG. 10 shows a cross-section of an embodiment of a battery receptacle system with a smaller battery that is retained by actuatable retention arms.

FIGS. 9-10 are cross-sections of an embodiment of a battery receptacle system 900. The battery receptacle system 900 includes a housing 912 in which different sizes/types of batteries may be inserted in different orientations between a first dual-contact assembly 904 and a second dual-contact assembly 922 (shown in FIGS. 11-12) to achieve an electrical connection. To accommodate batteries having different diameter sizes, the battery receptacle system 900 includes an actuatable mechanism 906. The actuatable mechanism 906 may include a resilient or compliant feature that imposes a bias on the movement of the actuatable mechanism to longitudinally retain a smaller battery in electrical connection with the dual-contact assemblies. In the illustrated embodiment, the actuatable mechanism 906 includes retention arms that can be selectively actuated to longitudinally retain smaller diameter batteries in electrical connection with the dual-contact assemblies. Correspondingly, the actuatable mechanism 906 is configured to be retractable to accommodate larger diameter batteries that can maintain electrical connection with the dual-contact assemblies via compression force between the battery and the housing 912.

In the illustrated embodiment, the actuatable retention arms of actuatable mechanism 906 actuate radially about a pivot 908. The pivot 908 is positioned substantially parallel to a longitudinal axis of a battery inserted in the battery receptacle system 900. The actuatable retention arms are spring loaded by a torsion spring 920 (shown in FIGS. 11-12) that biases the retention arms to extend toward each other to provide compression to hold a smaller diameter battery between the actuatable retention arms.

FIG. 9 shows a larger battery 910 having a diameter large enough to displace the actuatable retention arms 906. The larger battery 910 is large enough and/or heavy enough to overcome the spring force of torsion spring 920 causing the actuatable retention arms to retract to respective recesses 914 and 916 in the housing 912 when the larger battery 910 is inserted in the battery receptacle system 900. In some embodiments, the housing may include a structure (e.g., a battery compartment lid) for applying a downward force to help keep a larger battery securely seated. The actuatable retention arms actuate to respective recesses 914 and 916 so as to not impede the larger battery from electrically connecting between the first dual-contact assembly 904 and the second dual-contact assembly 922 (shown in FIGS. 11-12). At 928, FIG. 9 also shows an empty battery bay, in which neither a large nor small battery is installed.

FIG. 10 shows a smaller battery 902 having a diameter smaller than the larger battery 910. In FIG. 10, smaller battery 902 is retained in electrical connection with the first dual-contact assembly 904 and the second dual-contact assembly 922 (shown in FIGS. 11-12) by the actuatable mechanism 906. The smaller battery 902 may be inserted in the housing 912 of the battery receptacle system 900 with enough force to temporarily overcome the spring force of torsion spring 920 (shown in FIGS. 11-12) so that the smaller battery 902 is positioned between the actuatable retention arms of actuatable mechanism 906. When the smaller battery 902 is positioned between the actuatable retention arms, the spring force of the torsion spring 920 (shown in FIGS. 11-12) biases the actuatable retention arms to extend toward each other and retain the smaller battery 902 in electrical connection with the first dual-contact assembly 904 and the second dual-contact assembly 922. The actuatable mechanism 906 may center the smaller battery to align the positive terminal with the radial notch of the dual-contact assembly for positioning the positive terminal to electrically connect with the positive contact of the dual-contact assembly.

The actuatable retention arms may include features that facilitate displacement of the actuatable retention arms so that a battery may interact more easily with the actuatable retention arms. In the illustrated embodiment, the actuatable retention arms of actuatable mechanism 906 include edges 918 that slope away from the curved edge of the battery so that the battery may slide in between the actuatable retention arms. In some embodiments, the actuatable retention arms may include low friction surfaces and/or rollers to accommodate admittance of a battery. In some embodiments, the actuatable retention arms may include a beveled edge to accommodate admittance of a battery. In some embodiments, the actuatable retention arms may include a tab or other feature that can be gripped or otherwise manipulated by a user to displace the actuatable retention arms to insert a battery. In some embodiments, battery receptacle system 900 may be configured to prevent the actuatable retention arms from closing against each other (e.g., the actuatable retention arms and/or the housing may include mechanical stops).

The example battery receptacle system 900 illustrated in FIGS. 9 and 10 is not limiting. Any suitable mechanism for securing batteries in electrical connection with opposing dual-contact assemblies may be used. For example, in some embodiments, actuatable retention arms may actuate laterally, instead of pivoting, when a battery is inserted into the housing of the battery receptacle system. For example, each actuatable retention arm may be spring loaded to actuate laterally and biased to extend toward each other to retain a smaller diameter battery. Further, the actuatable retention arms may be displaced laterally to recesses in the housing of the battery receptacle system to accommodate a larger diameter battery. Yet another example may use compliant rubber, elastomer, foam or another material that is capable of centering a smaller battery, but which may be displaced to accommodate a larger battery.

At 928, FIG. 10 also shows an empty battery bay, in which neither a large nor small battery is installed.

Figure 11:
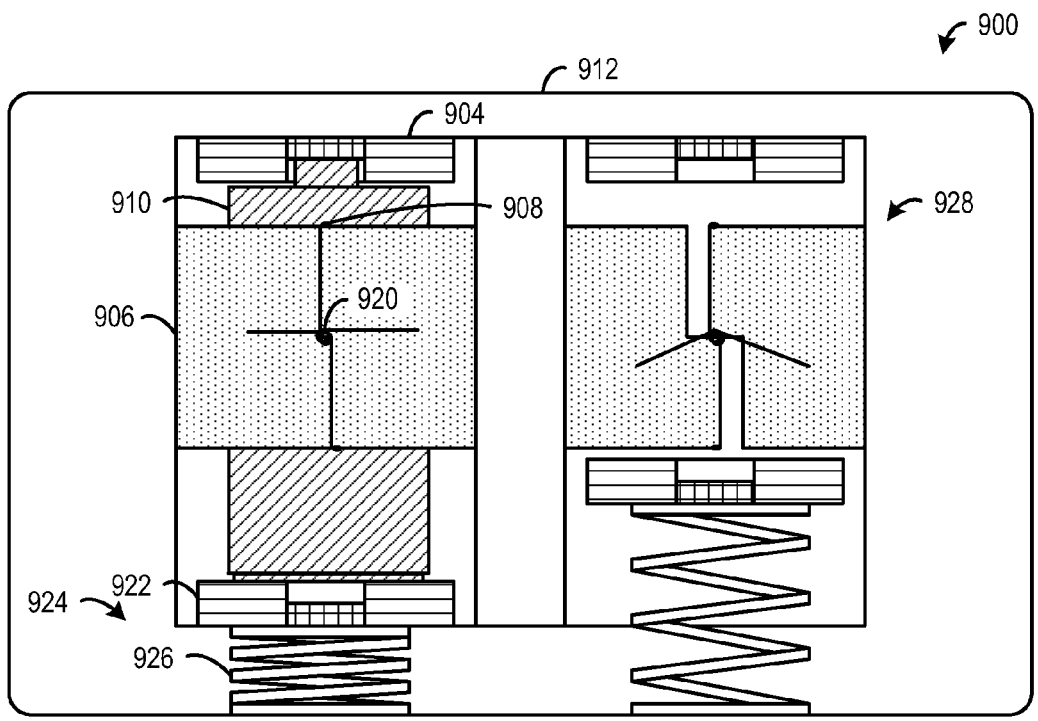
FIG. 11 is a bottom view of a battery receptacle system with a translating assembly compressed to retain a larger battery.
Figure 12:
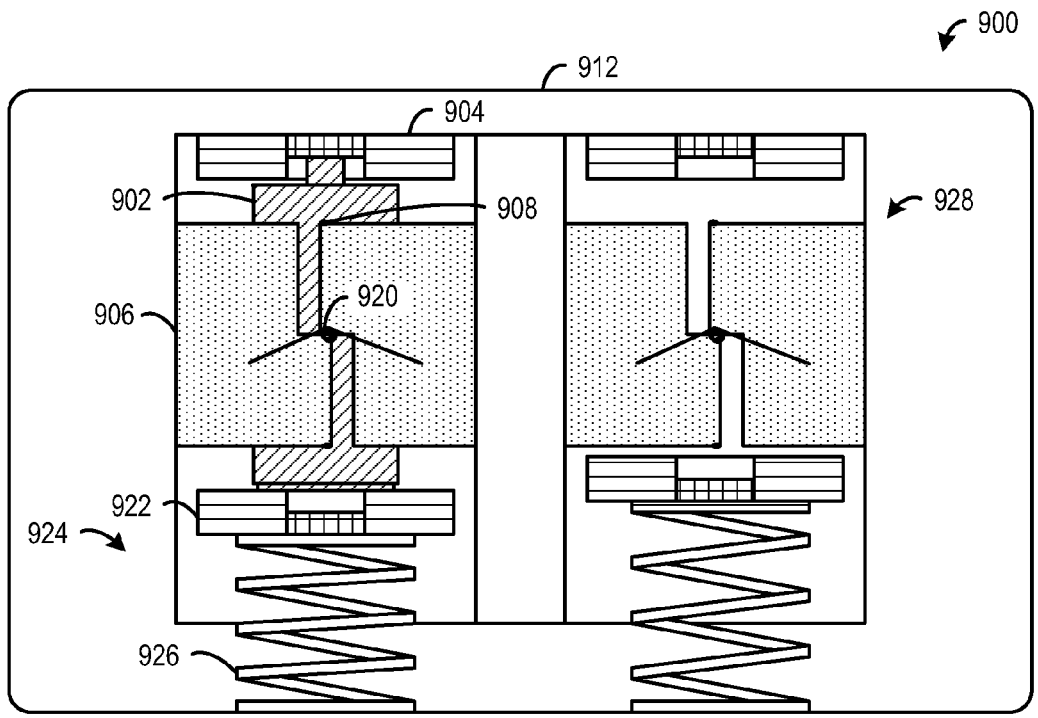
FIG. 12 is a bottom view of a battery receptacle system with a translating assembly extended to retain a smaller battery.

FIGS. 11-12 are bottom views of the battery receptacle system 900. The battery receptacle system 900 includes a moving assembly 924 to adjust a distance between the first dual-contact assembly 904 and the second dual-contact assembly 922 to retain different length batteries in electrical connection. In the illustrated embodiment, the moving assembly 924 includes a helical spring 926 that is coupled to the second dual-contact assembly 922. When a battery is inserted in the housing 912 of the battery receptacle system 900, the helical spring 926 is compressed and the spring force of the helical spring retains the battery in electrical connection with the first dual-contact assembly 904 and the second dual-contact assembly 922. The second dual-contact assembly 922 and/or moving assembly 924 may be interconnected with a sliding joint (e.g., a prismatic joint, dovetail, etc.) formed by the housing 912 to guide the movement of the second dual-contact assembly as the helical spring 926 expands and contracts. Such an arrangement is not limiting. Any suitable mechanism for changing the relative positioning of the opposing dual-contact assemblies may be used. For example, the moving assembly may translate, flex, pivot, and/or cantilever to change the position of one or more of the dual-contact assemblies. It will be appreciated that springs other than helical springs may be used. For example, radial or torsion springs may be used. Also, a linear spring that is made of compliant rubber, elastomer, metal, plastic, foam, or other material may be used. It will be appreciated that alignment mechanisms other than sliding a joint may be used.

FIG. 11 shows the larger battery 910 inserted in the housing 912 of the battery receptacle system 900. When the larger battery 910 is inserted in the housing 912 of the battery receptacle system 900, the helical spring 926 is compressed and the distance between the first dual-contact assembly 904 and the second dual-contact assembly 922 is increased relative to a position when no battery is inserted. The spring force of the helical spring 926 is applied to the larger battery 910 to maintain an electrical connection between the first dual-contact assembly 904 and the second dual-contact assembly 922. Further, when the larger battery 910 is inserted in the housing 912 of the battery receptacle system 900, the actuatable retention arms of the actuatable mechanism 906 rotate about pivot 908 to open and accommodate the larger battery. Correspondingly, when the actuatable retention arms of actuatable mechanism 906 rotate the torsion spring 920 flattens.

At 928, FIG. 11 also shows an empty battery bay, in which neither a large nor small battery is installed.

FIG. 12 shows the smaller battery 902 inserted in the housing 912 of the battery receptacle system 900. When the smaller battery 902 is inserted in the housing 912 of the battery receptacle system 900, the helical spring 926 is compressed and the distance between the first dual-contact assembly 904 and the second dual-contact assembly 922 is increased relative to when no battery is inserted. However, since the smaller battery 902 is shorter than the larger battery 910, the helical spring is compressed less than when the larger battery 910 is inserted in the housing. The spring force of the helical spring is applied to the smaller battery 902 to maintain an electrical connection between the first dual-contact assembly 904 and the second dual-contact assembly 922. Further, when the smaller battery 902 is inserted in the housing 912 of the battery receptacle system 900, the actuatable retention arms of actuatable mechanism 906 rotate about pivot 908 towards each other to retain the smaller battery. Correspondingly, when the actuatable retention arms of actuatable mechanism 906 rotate the torsion spring 920 twists to apply spring force to keep the actuatable retention arms closed against the smaller battery 902.

It will be appreciated that the first dual-contact assembly and/or the second dual-contact assembly may be adjustable via a moving assembly to a first location to allow the larger battery to electrically connect with the first dual-contact assembly and the second dual-contact assembly and a second location to allow the smaller battery to electrically connect with the first dual-contact assembly and the second dual-contact assembly. In other words, either one or both of the dual contact assemblies may be coupled to a moving assembly. In some embodiments, one or more dual-contact assemblies may include compliant features to account for manufacturing size variations in different size/type batteries. In some such embodiments, neither of the dual-contact assemblies may be moveable via a moving assembly.

According to the above described configurations, a battery receptacle system is set forth which provides for insertion and retention of different types of batteries in either of two opposing orientations, yet provides for appropriate current flow in either orientation. This greatly decreases the likelihood of improper or incorrect battery installation. Further, the actuatable retention arms, when included, provide longitudinal retention and alignment for various diameter batteries; and the translating assembly, when included, provides lateral retention for various length batteries. The arrangements described above provide continuous electrical contact and proper polarity current to the electrical device regardless of the orientation or type of battery inserted in the battery receptacle system.

The present disclosure is broadly applicable to cylindrical or rectangular prism or other shaped batteries having a terminal with a protrusion at one end of the battery and a substantially flat terminal at the opposite end of the battery. Examples of such batteries may include, for example, those referred to as A, AA, AAA, AAAA, C, D or others of similar such sizes or shapes. Further examples might include coin or button batteries. Note, though typical use might be with positive protrusion/flat negative terminal batteries; the present devices and methods may be used with batteries having flat positive terminals and protruding negative terminals.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A battery receptacle system, comprising:
   a first dual-contact assembly including a first negative contact proximate to a first positive contact, the first negative contact being electrically isolated from the first positive contact;
   a second dual-contact assembly including a second negative contact proximate to a second positive contact, the second negative contact being electrically isolated from the second positive contact;
   a moving assembly configured to adjust a distance between the first negative contact and the second positive contact and a distance between the first positive contact and the second negative contact; and
   an actuatable mechanism including two actuatable retention arms that are spring loaded and biased to radially pivot toward each other to longitudinally retain a battery in electrical connection with the first dual-contact assembly and the second dual-contact assembly by engaging a convex surface of the battery.

2. The battery receptacle system of claim 1, wherein the first negative contact and the first positive contact are configured such that when a first battery is in a first orientation in the battery receptacle system, the first positive contact electrically connects with a first positive terminal of the first battery without the first positive terminal of the first battery electrically connecting with the first negative contact; and when the first battery is in a second orientation in the battery receptacle system different from the first orientation, the first negative contact electrically connects with a first negative terminal of the first battery without the first negative terminal of the first battery electrically connecting with the first positive contact.

3. The battery receptacle system of claim 2, wherein the moving assembly is configured to selectively space the first negative contact apart from the second positive contact by a distance corresponding to a length of the first battery; and wherein the moving assembly is configured to space the first positive contact apart from the second negative contact by the distance corresponding to the length of the first battery.

4. The battery receptacle system of claim 3, wherein the first negative contact and the first positive contact are configured such that when a second battery of a different standard size than the first battery is in the first orientation in the battery receptacle system, the first positive contact electrically connects with a second positive terminal of the second battery without the second positive terminal of the second battery electrically connecting with the first negative contact; and when the second battery is in the second orientation in the battery receptacle system, the first negative contact electrically connects with a second negative terminal of the second battery without the second negative terminal of the second battery electrically connecting with the first positive contact.

5. The battery receptacle system of claim 4, wherein the moving assembly is configured to selectively space the first negative contact apart from the second positive contact by a distance corresponding to a length of the second battery; and wherein the moving assembly is configured to space the first positive contact apart from the second negative contact by the distance corresponding to the length of the second battery.

6. The battery receptacle system of claim 5, wherein a first longitudinal axis of the first battery in the first orientation is the same as a longitudinal axis of the first battery in the second orientation; and
   wherein a second longitudinal axis of the second battery in the first orientation is the same as a longitudinal axis of the second battery in the second orientation.

7. The battery receptacle system of claim 6, wherein the first longitudinal axis is vertically aligned with the second longitudinal axis.

8. The battery receptacle system of claim 2, wherein the actuatable retention arms are configured to retract into recesses in a housing of the battery receptacle system when the first battery is inserted in the battery receptacle system.

9. The battery receptacle system of claim 4, wherein the first dual-contact assembly further comprises:
   a first radial notch for positioning the first positive terminal of the first battery to electrically connect with the first positive contact at a first position; and
   a second radial notch for positioning the second positive terminal of the second battery to electrically connect with the first positive contact at a second position different from the first position, wherein the second radial notch is configured to prevent the first positive terminal of the first battery from electrically connecting with the first positive contact at the second position.

10. The battery receptacle system of claim 9, wherein the first radial notch has a first radius and the second radial notch has a second radius smaller than the first radius, and wherein the second radial notch interrupts the first radial notch.

11. The battery receptacle system of claim 10, wherein the first radius is approximately 2.75 millimeters and the second radius is approximately 1.9 millimeters.

12. A battery receptacle system, comprising:
a first dual-contact assembly including a first negative contact proximate to a first positive contact, the first negative contact being electrically isolated from the first positive contact;
a second dual-contact assembly including a second negative contact proximate to a second positive contact, the second negative contact being electrically isolated from the second positive contact;
a moving assembly configured to adjust a distance between the first dual-contact assembly and the second dual-contact assembly from a distance that accommodates an AA standard size battery to a distance that accommodates an AAA standard size battery;
an actuatable mechanism to selectively move to a retention position retaining an AAA standard size battery when the AAA standard size battery is installed and to selectively move to a recessed position when an AA standard size battery is installed, the actuatable mechanism including two actuatable retention arms that are spring loaded and biased to radially pivot toward each other to longitudinally retain a battery in electrical connection with the first dual-contact assembly and the second dual-contact assembly by engaging a convex surface of the battery.

13. The battery receptacle system of claim 12, wherein the first dual-contact assembly and the second dual-contact assembly are configured to establish a correct polarity connection with the AA standard size battery in a first orientation when a positive terminal of the AA standard size battery connects to the first positive contact or a second orientation when the positive terminal of the AA standard size battery connects with the second positive contact, and wherein the first dual-contact assembly and the second dual-contact assembly are configured to establish a correct polarity connection with the AAA standard size battery in a first orientation when a positive terminal of the AAA standard size battery connects to the first positive contact or a second orientation when the positive terminal of the AAA standard size battery connects with the second positive contact.

14. The battery receptacle system of claim 13, wherein a first longitudinal axis of the AA standard size battery in the first orientation is the same as a longitudinal axis of the AA standard size battery in the second orientation; and
wherein a second longitudinal axis of the AAA standard size battery in the first orientation is the same as a longitudinal axis of the AAA standard size battery in the second orientation.

15. The battery receptacle system of claim 14, wherein the first longitudinal axis is vertically aligned with the second longitudinal axis.

16. The battery receptacle system of claim 12,
wherein the actuatable mechanism longitudinally retains the AAA standard size battery in electrical connection with the first positive contact or the first negative contact.

17. The battery receptacle system of claim 16, wherein the actuatable retention arms are configured to retract into recesses in a housing of the battery receptacle system when the AA standard size battery is inserted in the battery receptacle system.

18. A battery receptacle system, comprising:
a housing;
a first dual-contact assembly nonmovably connected to the housing and including a first negative contact and a first positive contact;
a second dual-contact assembly movably connected to the housing and including a second negative contact and a second positive contact,
the second dual-contact assembly movable relative to the housing and the first dual-contact assembly to adjust a distance between the first negative contact of the first dual-contact assembly and the second positive contact of the second dual-contact assembly and a distance between the first positive contact of the first dual-contact assembly and the second negative contact of the second dual-contact assembly;
the first dual-contact assembly and the second dual-contact assembly cooperating to provide polarity protection by selectively receiving batteries having different standard sizes in opposite orientations; and
an actuatable mechanism including two actuatable retention arms that are spring loaded and biased to radially pivot toward each other to longitudinally retain a battery in electrical connection with the first dual-contact assembly and the second dual-contact assembly by engaging a convex surface of the battery.

19. The battery receptacle system of claim 1, wherein the actuatable mechanism is separate from and positioned between the first dual-contact assembly and the second dual-contact assembly.

20. The battery receptacle system of claim 1, wherein each of the two actuatable retention arms radially pivot about a pivot axis that is parallel to a longitudinal axis of a battery retained by the actuatable mechanism.

* * * * *